(12) United States Patent
Uchida (10) Patent No.: US 10,871,629 B2
(45) Date of Patent: Dec. 22, 2020

(54) IMAGING APPARATUS AND CONTROL METHOD OF IMAGING APPARATUS

(71) Applicant: CANON KABUSHIKI KAISHA, Tokyo (JP)

(72) Inventor: Mineo Uchida, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/650,607

(22) Filed: Jul. 14, 2017

(65) Prior Publication Data

US 2018/0024313 A1 Jan. 25, 2018

(30) Foreign Application Priority Data

Jul. 25, 2016 (JP) .................................. 2016-145554

(51) Int. Cl.
*G02B 7/34* (2006.01)
*H04N 5/355* (2011.01)
*H04N 5/361* (2011.01)
*H04N 5/357* (2011.01)
*H04N 5/3745* (2011.01)
*H04N 5/232* (2006.01)
*H04N 5/341* (2011.01)
*H04N 5/349* (2011.01)
*H04N 5/369* (2011.01)

(52) U.S. Cl.
CPC ............ *G02B 7/34* (2013.01); *H04N 5/23212* (2013.01); *H04N 5/341* (2013.01); *H04N 5/349* (2013.01); *H04N 5/3575* (2013.01); *H04N 5/35563* (2013.01); *H04N 5/361* (2013.01); *H04N 5/3696* (2013.01); *H04N 5/37457* (2013.01)

(58) Field of Classification Search
CPC ......... G02B 7/34; H04N 5/37457; H04N 5/361; H04N 5/3575; H04N 5/3696; H04N 5/349; H04N 5/23212; H04N 5/35563; H04N 5/341
See application file for complete search history.

(56) References Cited

U.S. PATENT DOCUMENTS

| 5,568,378 A | * | 10/1996 | Wojsznis | ............. | G05B 13/048 700/44 |
| 10,136,086 B2 | | 11/2018 | Ikedo | | |
| 2004/0095494 A1 | * | 5/2004 | Mentzer | ................. | H04N 5/335 348/308 |
| 2005/0012827 A1 | * | 1/2005 | Nakasuji | .................. | H04N 5/20 348/222.1 |

(Continued)

FOREIGN PATENT DOCUMENTS

| CN | 1617569 A | 5/2005 |
| CN | 101309349 A | 11/2008 |

(Continued)

*Primary Examiner* — John W Lee
(74) *Attorney, Agent, or Firm* — Canon U.S.A., Inc. IP Division (57) ABSTRACT

An imaging apparatus includes a clamp level is multiplied by a first feedback gain, and correct a signal of a part of photoelectric conversion portions of a unit pixel in an opening region based on a result of multiplication in which an error amount between a signal of a part of a photoelectric conversion portions of the unit pixel in a light-shielded region and a clamp level is multiplied by a second feedback gain, and thus the signal of the unit pixel can be corrected precisely.

6 Claims, 11 Drawing Sheets

(56) References Cited

U.S. PATENT DOCUMENTS

| | | | | |
|---|---|---|---|---|
| 2005/0058458 A1* | 3/2005 | Lavigne | ............... | G02F 2/004 398/149 |
| 2008/0211946 A1* | 9/2008 | Uchida | ............... | H04N 3/1568 348/294 |
| 2009/0185719 A1* | 7/2009 | Erignac | ............... | G06T 7/292 382/104 |
| 2010/0128150 A1* | 5/2010 | Taguchi | ............... | H04N 5/361 348/243 |
| 2010/0231761 A1* | 9/2010 | Yanai | ............... | H04N 5/361 348/243 |
| 2011/0025871 A1* | 2/2011 | Yoshioka | ............... | H04N 5/35581 348/222.1 |
| 2012/0120291 A1* | 5/2012 | Shiohara | ............... | H04N 5/353 348/296 |
| 2013/0093909 A1* | 4/2013 | Uchida | ............... | H04N 5/23232 348/221.1 |
| 2013/0093912 A1* | 4/2013 | Uchida | ............... | H04N 5/365 348/222.1 |
| 2013/0250154 A1* | 9/2013 | Hirose | ............... | H04N 5/23212 348/311 |
| 2014/0252208 A1* | 9/2014 | Fujinaka | ............... | H04N 5/363 250/208.1 |
| 2014/0285705 A1* | 9/2014 | Uchida | ............... | H04N 5/23212 348/345 |
| 2015/0103219 A1* | 4/2015 | Kasuga | ............... | H04N 5/363 348/300 |
| 2018/0294306 A1* | 10/2018 | Sambonsugi | ............... | H01L 27/14643 |

FOREIGN PATENT DOCUMENTS

| | | |
|---|---|---|
| CN | 101682701 A | 3/2010 |
| CN | 103139494 A | 6/2013 |
| CN | 104702863 A | 6/2015 |
| CN | 105282431 A | 1/2016 |
| JP | 2001-124984 A | 5/2001 |
| JP | 2003-156677 A | 5/2003 |
| JP | 2007-158830 A | 6/2007 |
| JP | 2010-147638 A | 7/2010 |
| JP | 2014-212450 A | 11/2014 |
| JP | 2014-216795 A | 11/2014 |

* cited by examiner

FIG.4A
WHEN DEVIATING FROM IN-FOCUS STATE

FIG.4B
SUBSTANTIALLY IN-FOCUS STATE

Region_c 801 803

PA → Region_i | Region_c | Region_c | Region_i | Region_c | Region_i | Region_c | Region_i | Region_c Region_c | Region_i | Region_c | Region_i | Region_c | Region_i | Region_c  802

IMAGING APPARATUS AND CONTROL METHOD OF IMAGING APPARATUS

BACKGROUND OF THE INVENTION

Field of the Invention

The aspect of the embodiments relates to an imaging apparatus and a control method of the imaging apparatus.

Description of the Related Art

In recent years, due to progress in multi-functionalization of an imaging apparatus using an image sensor such as a complementary metal-oxide semiconductor (CMOS) sensor, control of the imaging apparatus such as focus adjustment has been also executed based on object information acquired by the image sensor in addition to generating captured still images or moving images. For example, Japanese Patent Application Laid-Open No. 2001-124984 discusses a technique which enables an imaging apparatus to execute pupil division type focus detection by using a signal acquired from an image sensor. In other words, one micro lens and two photodiodes are provided at each pixel of the image sensor, and the photodiodes respectively receive light passing through different pupils of the imaging lens. Focus detection can be executed by comparing the signals output from the two photodiodes, and a captured image can be generated by compositing the signals output from the two photodiodes. Further, Japanese Patent Application Laid-Open No. 2007-158830 discusses optical black (OB) clamp processing in which a dark level is corrected based on an output value of an optically-shielded OB pixel.

In the configuration described in Japanese Patent Application Laid-Open No. 2001-124984, because each pixel includes a plurality of photodiodes, it will take long time to separately read out signals of all of the photodiodes, and thus a frame rate is lowered.

SUMMARY OF THE INVENTION

According to an aspect of the embodiments, an imaging apparatus includes a pixel region having a plurality of unit pixels each of which includes a plurality of photoelectric conversion portions, in a matrix form, a readout controller that reads out a signal of a part of photoelectric conversion portions in a unit pixel in a light-shielded region of the pixel region, reads out a composite signal of all of photoelectric conversion portions in a different unit pixel in the light-shielded region, reads out a signal of a part of photoelectric conversion portions in a unit pixel in an opening region of the pixel region, and reads out a composite signal of all of photoelectric conversion portions in a different unit pixel in the opening region, and a clamp processor that corrects the composite signal of all of the photoelectric conversion portions of the unit pixel in the opening region based on a result of multiplication in which an error amount between the composite signal of all of the photoelectric conversion portions of the unit pixel in the light-shielded region and a clamp level is multiplied by a first feedback gain, and corrects the signal of the part of the photoelectric conversion portions of the unit pixel in the opening region based on a result of multiplication in which an error amount between the signal of the part of the photoelectric conversion portions of the unit pixel in the light-shielded region and the clamp level is multiplied by a second feedback gain.

Further features of the disclosure will become apparent from the following description of exemplary embodiments with reference to the attached drawings.

DESCRIPTION OF THE EMBODIMENTS

Figure 1:
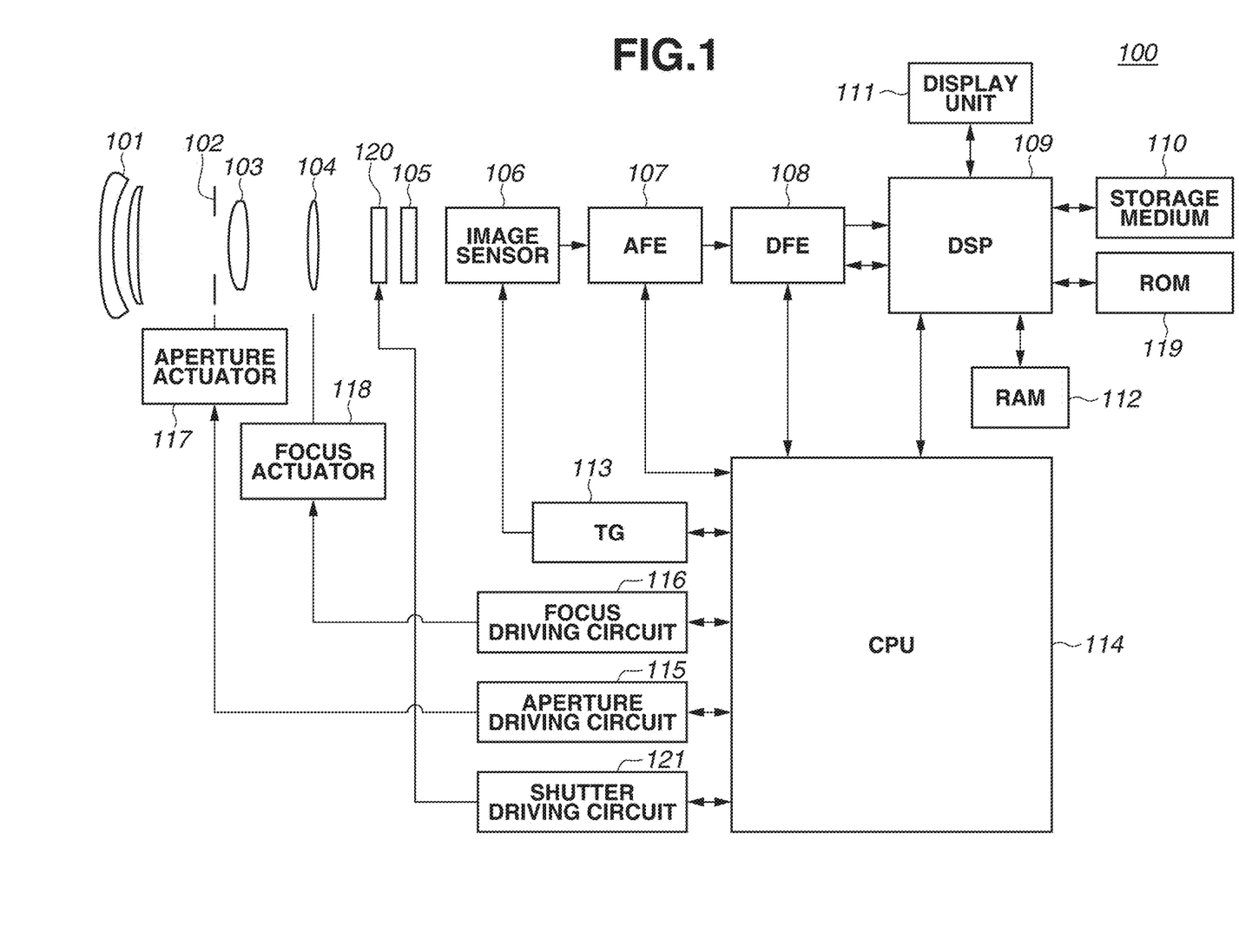
FIG. 1 is a block diagram illustrating a configuration example of an imaging apparatus.

FIG. 1 is a block diagram illustrating a configuration example of an imaging apparatus 100 according to a first exemplary embodiment of the disclosure. The imaging apparatus 100 is applicable to a smartphone, a tablet, an industrial camera, and a medical camera in addition to a digital camera and a video camera. A first lens group 101 arranged at a leading end of an image forming optical system is held to be capable of moving forward and backward in an optical axis direction. An aperture 102 adjusts a light amount of an imaging period by adjusting an aperture diameter. A second lens group 103 realizes an optical zoom function in cooperation with the forward/backward movement of the first lens group. A third lens group 104 moves forward or backward in the optical axis direction to adjust a focus. An optical low-pass filter 105 is an optical sensor for reducing a false color or moire in the captured image.

An image sensor (imaging unit) 106 executes photoelectric conversion (imaging) of an object image formed by the lens groups 101, 103, and 104 to generate an image capture signal (pixel signal). For example, the image sensor 106 may be a Bayer array complementary metal-oxide semiconductor (CMOS) image sensor. An analog front end (AFE) 107 converts an analog image signal output from the image sensor 106 to a digital signal (i.e., image data). A digital front end (DFE) 108 executes predetermined arithmetic processing on the image data output from the AFE 107. The AFE 107 also executes optical black (OB) clamp processing for adjusting a dark level of the image capture signal in addition to executing the analog/digital (A/D) conversion processing. In the OB clamp processing, a dark level (output level at a time of dark) of the image capture signal is corrected with reference to a signal of an optically-shielded OB pixel region in the image sensor 106.

A digital signal processor (DSP) 109 executes correction processing or development processing on image data output from the DFE 108. The DSP 109 further executes autofocus (AF) calculation for calculating a defocus amount from the image data. Furthermore, the DSP 109 stores the image data in a storage medium 110. A display unit 111 displays captured images and various menu screens thereon, and an example of the display unit 111 is a liquid crystal display (LCD). A random access memory (RAM) 112 is connected to the DSP 109, so as to store image data temporarily. A timing generator (TG) 113 supplies a drive signal to the image sensor 106.

A central processing unit (CPU) 114 is a controller which executes control of the AFE 107, the DFE 108, the DSP 109, the TG 113, an aperture driving circuit 115, a focus driving circuit 116, and a shutter driving circuit 121. Further, based on the result of the AF calculation performed by the DSP 109, the CPU 114 controls the focus driving circuit 116. The CPU 114 realizes the control by reading and executing a control program stored in a read only memory (ROM) 119 or a memory.

The aperture driving circuit 115 drives and controls an aperture actuator 117 to drive the aperture 102. The focus driving circuit 116 drives and controls a focus actuator 118 to make the third lens group 104 move forward or backward in the optical axis direction to adjust a focus. The ROM 119 stores various types of correction data. The shutter driving circuit 121 controls a mechanical shutter 120. The mechanical shutter 120 controls an exposure amount of the image sensor 106 when a still image is captured. The mechanical shutter 120 remains in the opening state when a live view operation or a moving image-capturing operation is performed so that the image sensor 106 is exposed to light continuously.

Figure 2:
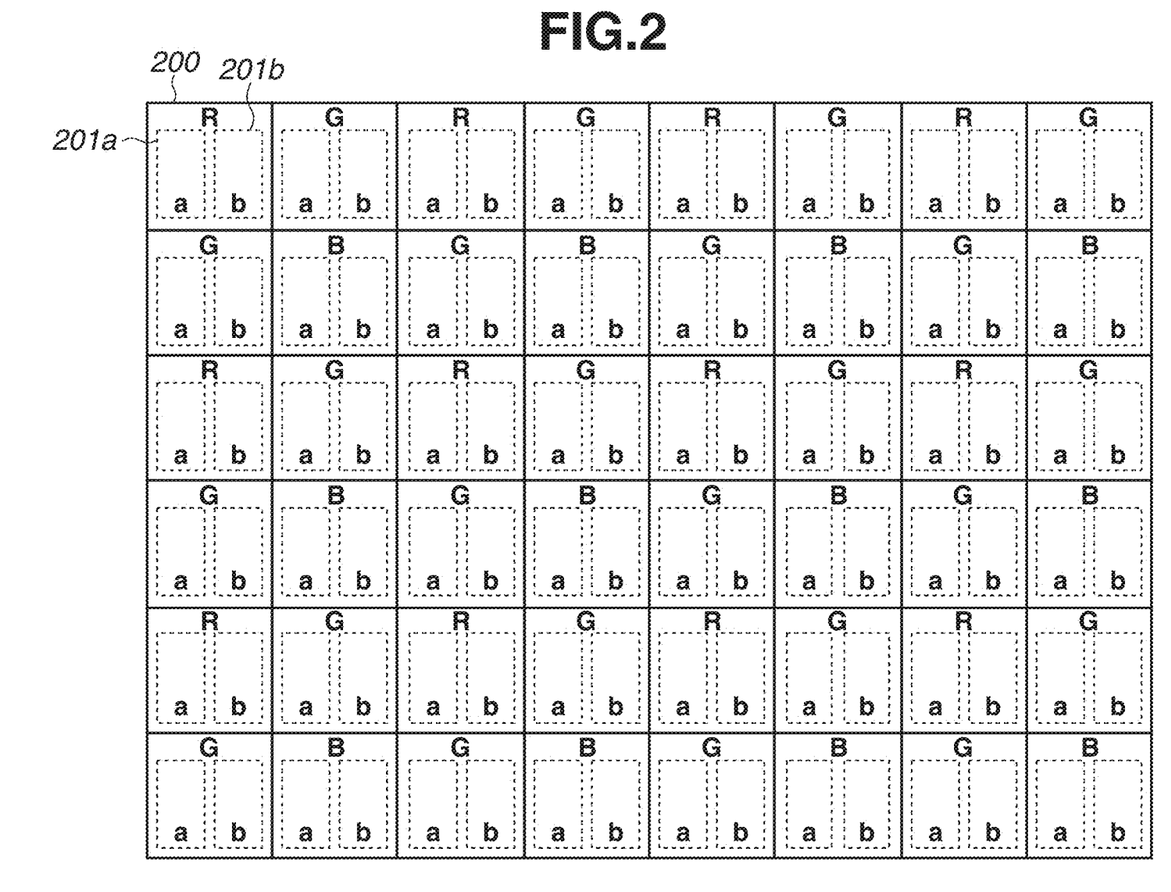
FIG. 2 is a diagram illustrating arrangement of pixels of an image sensor.

FIG. 2 is a diagram illustrating an example of the arrangement of pixels of the image sensor 106. The image sensor 106 includes a plurality of unit pixels 200 arranged in a two-dimensional matrix form. Color filters of red (R), green (G), and blue (B) are arranged in the unit pixels 200 in a Bayer array state. Further, each of the unit pixels 200 includes sub-pixels a and b. The sub-pixel a includes a photodiode 201*a*, and the sub-pixel b includes a photodiode 201*b*. The photodiodes 201*a* and 201*b* are photoelectric conversion portions which execute photoelectric conversion and generate pixel signals. The pixel signals respectively output from the sub-pixels a and b are used for focus detection. Further, a combined signal (composite signal) acquired by adding (compositing) the pixel signals output from the sub-pixels a and b is used for image generation.

Figure 3:
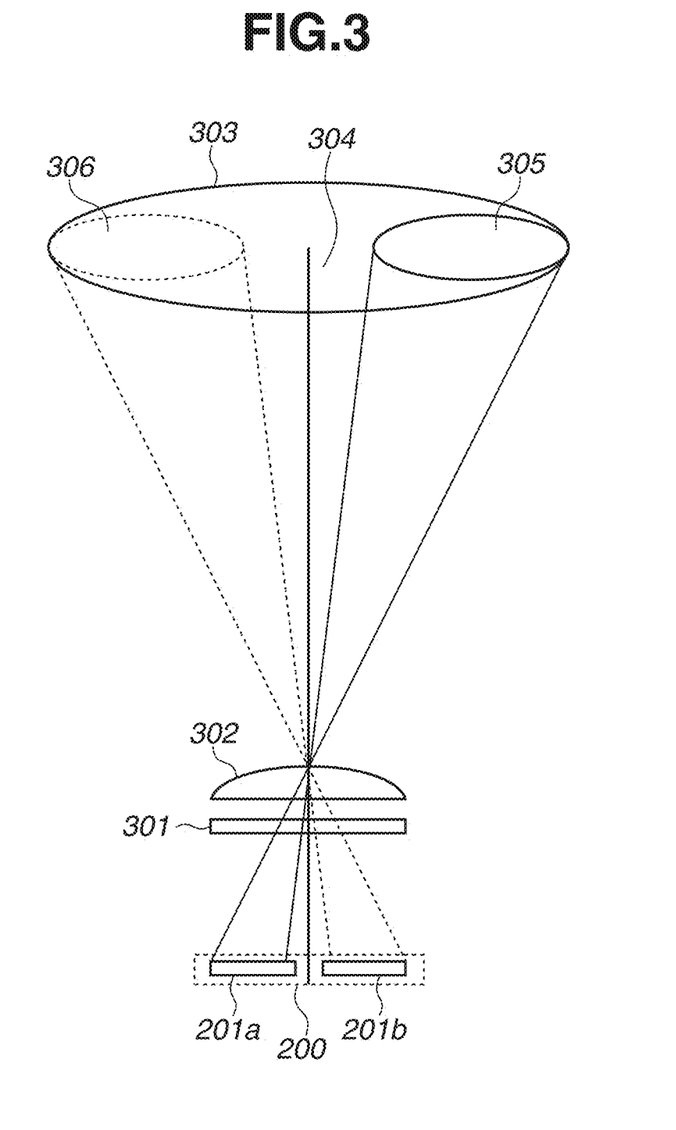
FIG. 3 is a diagram illustrating a relationship between a light flux emitted from an exit pupil of an imaging lens and pixels.

FIG. 3 is a diagram illustrating a relationship between a light flux emitted from an exit pupil 303 of an imaging lens configured of the first to the third lens groups and the apertures 101 to 104 and each of the unit pixels 200. A color filter 301 and a micro lens 302 are formed on the upper side of each of the unit pixels 200. The light passing through the exit pupil 303 of the imaging lens enters each unit pixel 200 with an optical axis 304 as a center. A light flux that has passed through a pupil region 305 as a part of the region of the pupil exit 303 of the imaging lens passes through the micro lens 302, so as to be received by the photodiode 201*a* of the sub-pixel a. On the other hand, a light flux that has passed through a pupil region 306 as another part of the region of the pupil exit 303 passes through the micro lens 302, so as to be received by the photodiode 201*b* of the sub-pixel b. Accordingly, the photodiode 201*a* of the sub-pixel a and the photodiode 201*b* of the sub-pixel b receive light from respectively different pupil regions 305 and 306 of the pupil exit 303 of the imaging lens. Therefore, comparison of the output signals from the photodiodes 201*a* and 201*b* of the sub-pixels a and b enables to execute phase difference type focus detection.

Figure 4A:
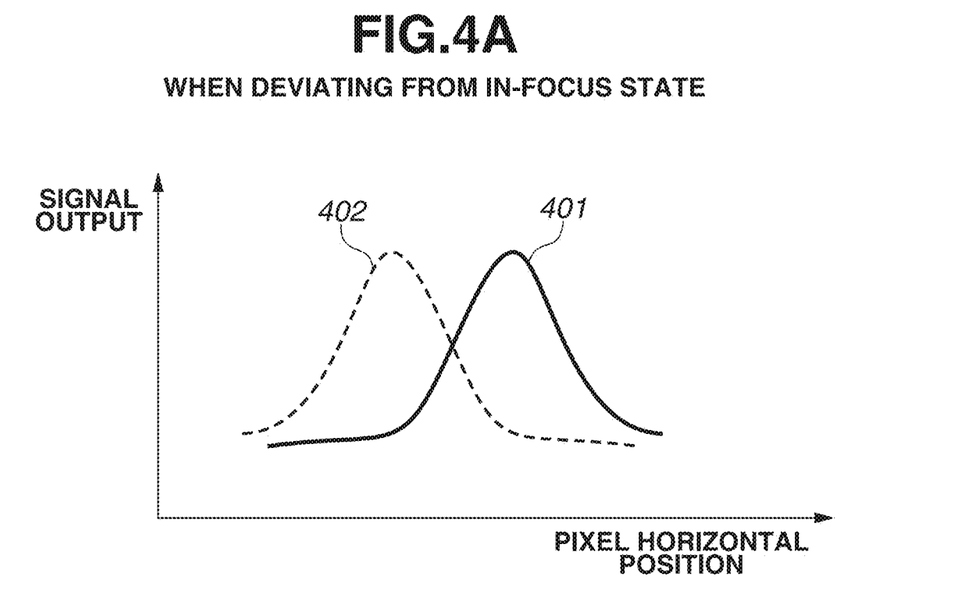
FIGS. 4A and 4B are graphs each illustrating a relationship between a state of focus adjustment and an image signal.
Figure 4B:
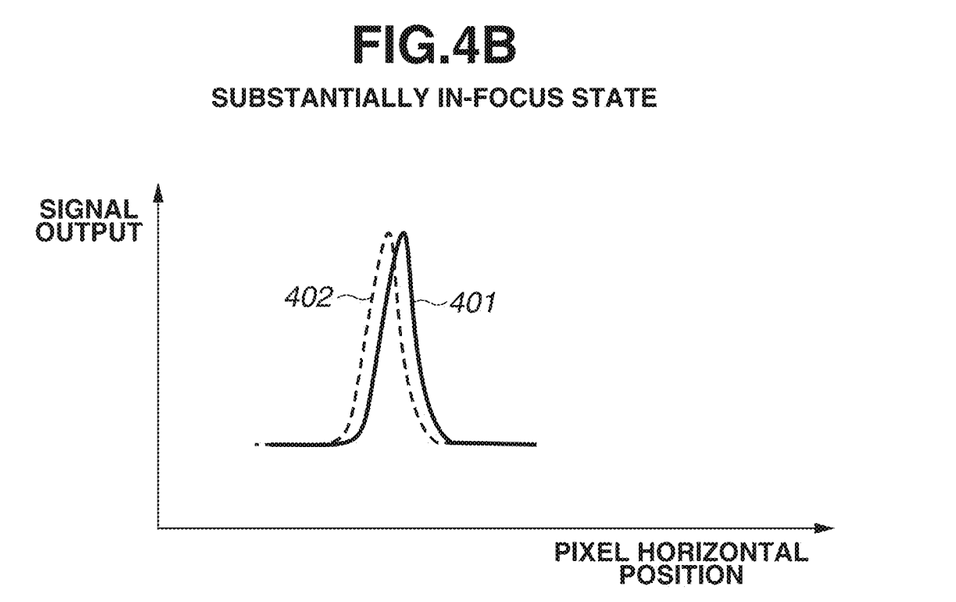

FIGS. 4A and 4B are diagrams illustrating correlations between an image signal waveform 401 acquired by the sub-pixel a and an image signal waveform 402 acquired by the sub-pixel b in different focus states. As illustrated in FIG. 4A, when a focus state deviates from an in-focus state, the image signal waveforms 401 and 402 respectively acquired by the sub-pixels a and b do not conform to each other but misalign considerably. As illustrated in FIG. 4B, when the focus state approximates to the in-focus state, misalignment between the image signal waveforms 401 and 402 is reduced, and the image signal waveforms 401 and 402 overlap with each other in the in-focus state. As described above, focus adjustment can be executed by detecting a defocus amount from the amount of misalignment between the image signal waveforms 401 and 402 respectively acquired by the sub-pixels a and b.

Figure 5:
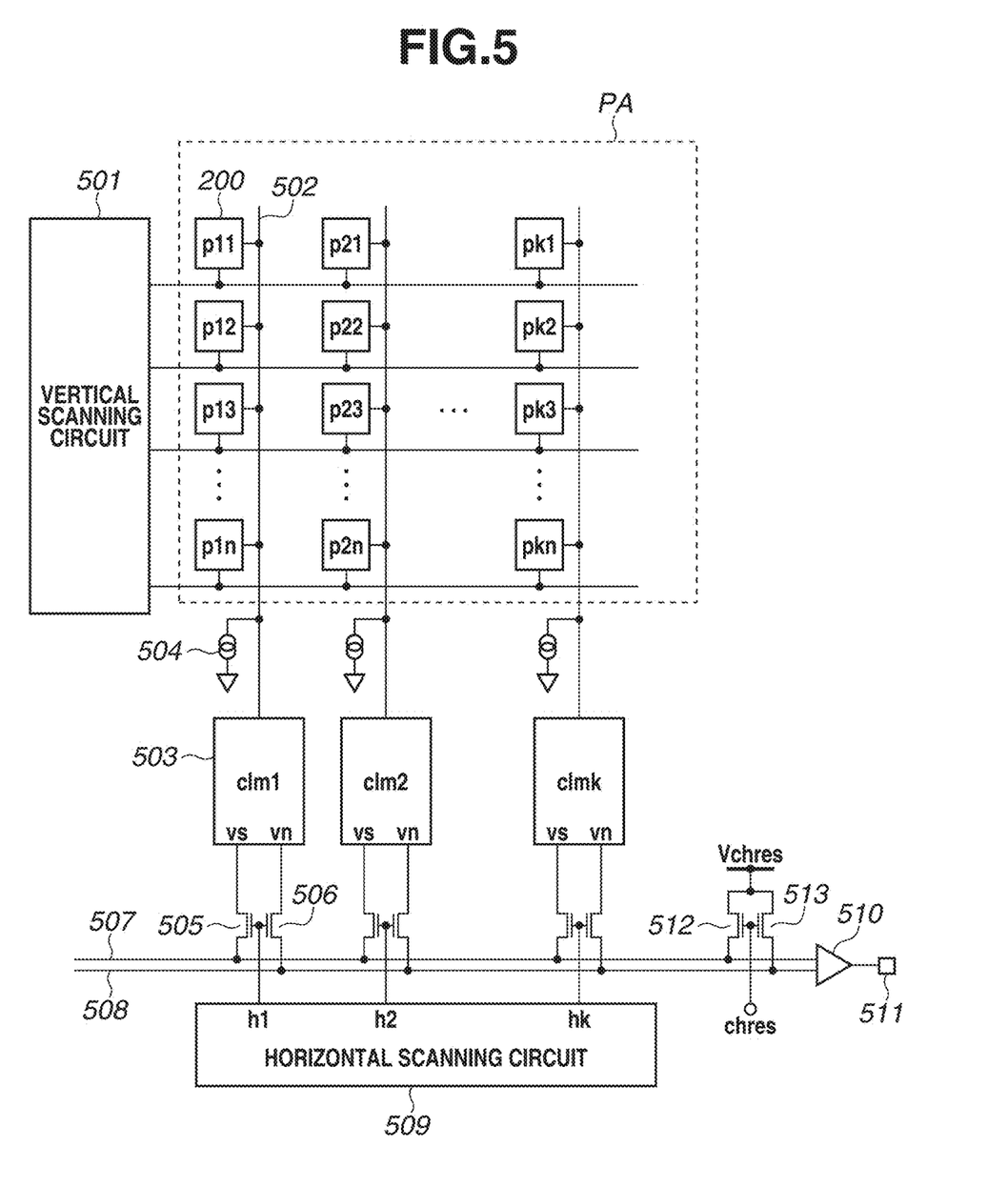
FIG. 5 is a diagram illustrating a configuration example of the image sensor.

FIG. 5 is a diagram illustrating a configuration example of the image sensor 106. A pixel region PA includes a plurality of unit pixels 200 arranged in a two-dimensional matrix form, which is expressed by unit pixels p11 to pkn in n-rows by k-columns.

Figure 6:
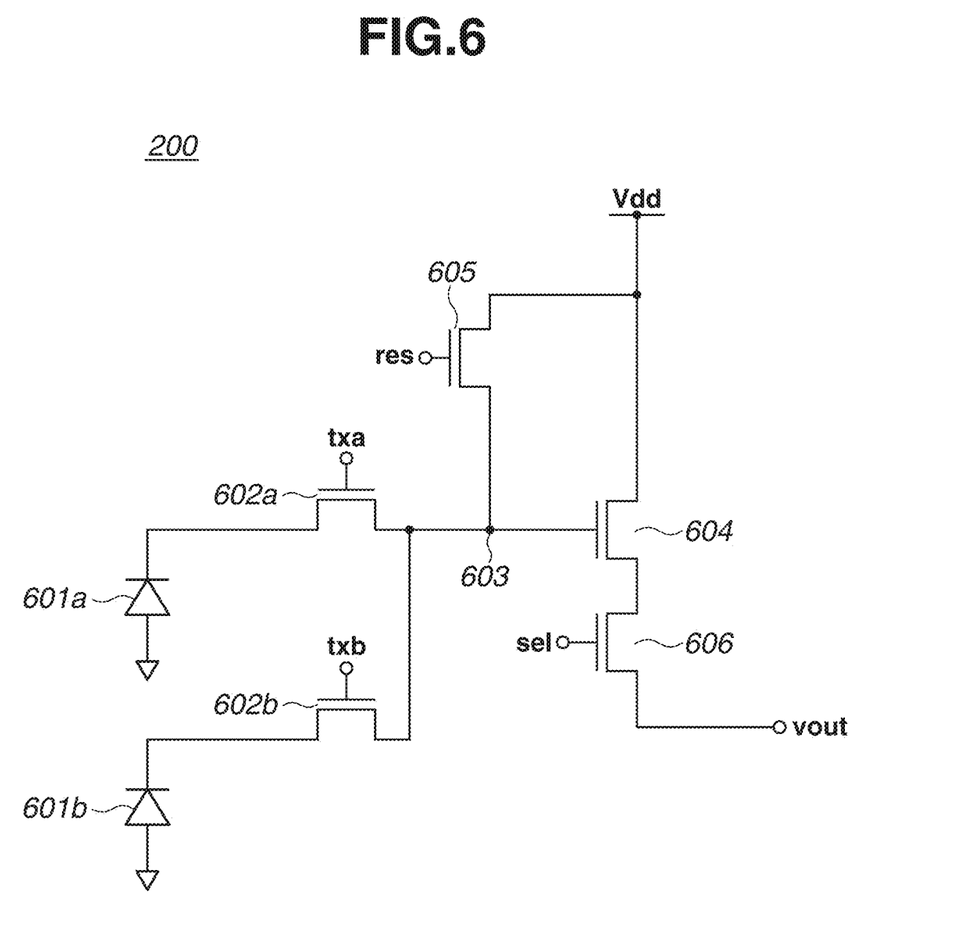
FIG. 6 is a diagram illustrating a configuration example of one pixel of the image sensor.

FIG. 6 is a circuit diagram illustrating a configuration example of a unit pixel 200. A photodiode 601*a* is a first photoelectric conversion portion corresponding to the photodiode 201*a* of the sub-pixel a. A photodiode 601*b* is a second photoelectric conversion portion corresponding to the photodiode 201*b* of the sub-pixel b. The photodiodes 601*a* and 601*b* are the photoelectric conversion portions for executing photoelectric conversion, which convert incident light into electric charges and stores the electric charges according to the exposure amount. A transfer gate 602*a* transfers the electric charges stored in the photodiode 601*a* to a floating diffusion (FD) portion 603 when a signal txa applied to the transfer gate 602*a* becomes a high-level. A transfer gate 602*b* transfers the electric charges stored in the photodiode 601*b* to the FD portion 603 when a signal txb applied to the transfer gate 602*b* becomes a high-level. The FD portion 603 is connected to a gate of an FD amplifier 604. The FD amplifier 604 outputs voltage according to the electric charge amount of the FD portion 603. An FD reset switch 605 resets the FD portion 603 to a power source voltage Vdd when a signal res applied to the gate becomes a high-level. Further, when the signals res, txa, and txb become a high-level simultaneously, the FD reset switch 605 and the transfer gates 602*a* and 602*b* are ON, so that the photodiodes 601*a* and 601*b* are reset to the power source voltage Vdd via the FD portion 603. A pixel selection switch 606 outputs the output voltage of the FD amplifier 604 to an output node vout as a pixel signal when a signal sel applied to the gate becomes a high-level.

As illustrated in FIG. 5, a vertical scanning circuit 501 supplies a plurality of driving signals res, sel, txa, and txb for controlling respective switches of a unit pixel 200 to each of the unit pixels 200. The above-described driving signals will be described below in detail. An output node vout of each of the unit pixels 200 is connected to a readout circuit 503 common to the unit pixels 200 in the same row via a row signal line (vertical output line) 502 at each row.

Figure 7:
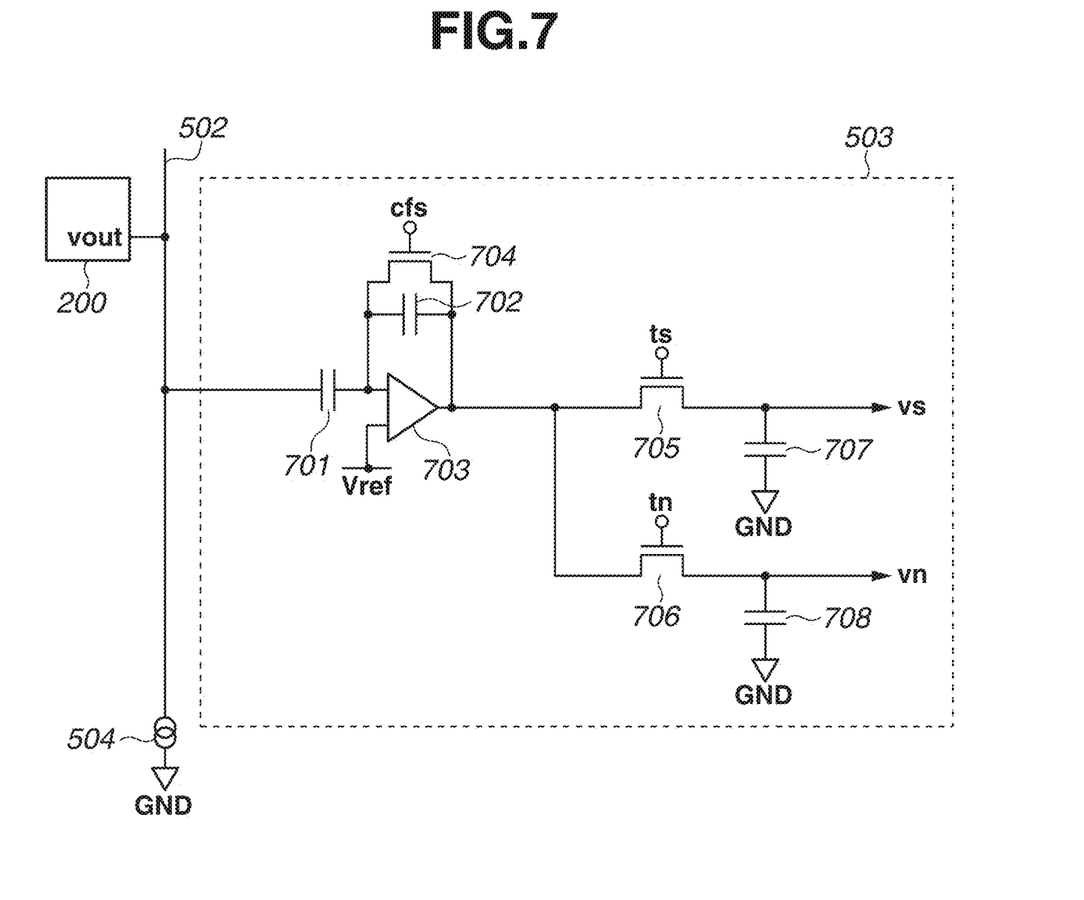
FIG. 7 is a diagram illustrating a readout circuit of each row of the image sensor.

FIG. 7 is a diagram illustrating a configuration example of the readout circuit 503. A row signal line 502 is provided at each row of unit pixels 200, and the output nodes vout of one-row worth of unit pixels 200 are connected thereto. A current source 504 is connected to the row signal line 502.

The current source 504 and the FD amplifiers 604 of the unit pixels 200 connected to the row signal line 502 constitute a source follower circuit. A clamp capacitor 701 has a capacitor value C1. A feedback capacitor 702 has a capacitor value C2. A node of a reference voltage Vref is connected to a non-inverting input terminal of an operating amplifier 703, whereas the clamp capacitor 701 is connected to an inverting input terminal thereof. A switch 704 is controlled by a signal cfs to short-circuit both ends of the feedback capacitor 702. According to a signal ts, a transfer switch 705 transfers an output signal of the operating amplifier 703 to an S-signal retention capacitor 707. According to a signal tn, a transfer switch 706 transfers an output signal of the operating amplifier 703 to an N-signal retention capacitor 708. Through a readout operation described below, a pixel signal (S-signal) Sa based on the photoelectric conversion of the sub-pixel a, a pixel signal (S-signal) Sb based on the photoelectric conversion of the sub-pixel b, or a composite signal (S-signal) Sab composited from the pixel signals based on the photoelectric conversion of the sub-pixels a and b are stored in the S-signal retention capacitor 707. Further, a noise signal (N-signal) N based on release of a reset state of a unit pixel 200 is stored in the N-signal retention capacitor 708. The S-signal retention capacitor 707 is connected to an output node vs of the readout circuit 503. The N-signal retention capacitor 708 is connected to an output node vn of the readout circuit 503.

As illustrated in FIG. 5, the output node vs of the readout circuit 503 is connected to a horizontal transfer switch 505. The output node vn of the readout circuit 503 is connected to a horizontal transfer switch 506. The horizontal transfer switches 505 and 506 of the rows are respectively controlled by output signals h1 to hk of a horizontal scanning circuit 509. The output signals h1 to hk sequentially become a high-level, so that the horizontal transfer switches 505 and 506 of the respective rows are ON sequentially, and the signals stored in the S-signal retention capacitors 707 and the N-signal retention capacitors 708 of respective rows are transferred to the horizontal output lines 507 and 508, respectively. The horizontal output lines 507 and 508 are connected to input terminals of a differential amplifier 510. The differential amplifier 510 takes a difference between the pixel signal of the horizontal output line 507 and the noise signal of the horizontal output line 508 and applies a predetermined gain simultaneously, so as to output a final output signal to an output terminal 511. Hereinafter, a final output signal of the output terminal 511 based on the pixel signal Sa is referred to as an image signal Pa, a final output signal of the output terminal 511 based on the pixel signal Sb is referred to as an image signal Pb, and a final output signal of the output terminal 511 based on the composite signal Sab is referred to as a composite image signal Pab. Horizontal output line reset switches 512 and 513 are ON when a signal chres applied to the gate becomes a high-level, so as to reset the horizontal output lines 507 and 508 to a reset voltage Vchres.

Figure 8:
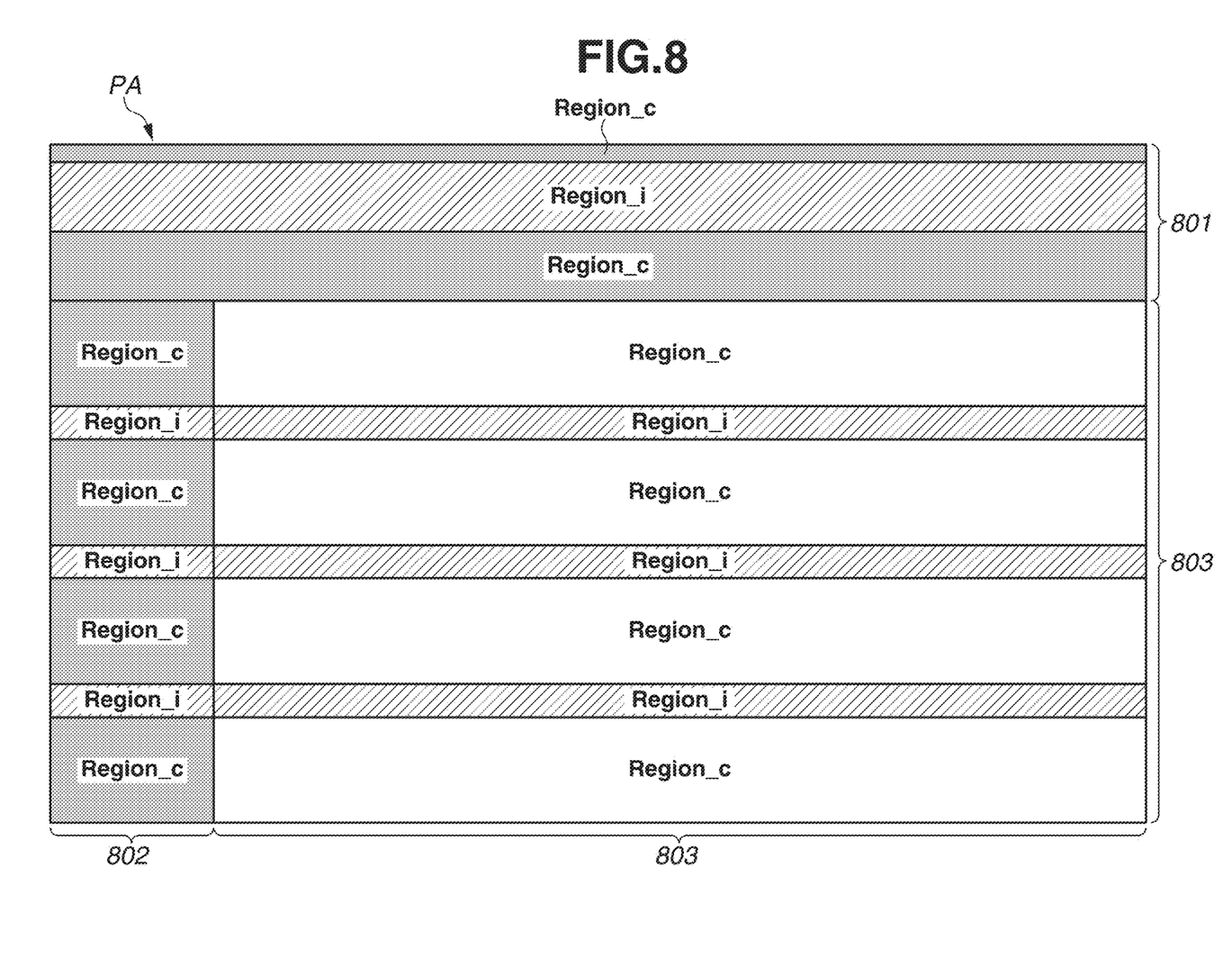
FIG. 8 is a diagram illustrating arrangement of pixel regions.

FIG. 8 is a diagram illustrating the pixel region PA of the image sensor 106. The pixel region PA includes a vertical OB region (first light-shielded region) 801 in the upper portion of the pixel region PA, a horizontal OB region (second light-shielded region) 802 in the left portion of the pixel region PA, and an opening region 803 other than the regions 801 and 802. The vertical OB region 801 is provided on a row different from a row of the opening region 803. The horizontal OB region 802 is provided on a row the same as the row of the opening region 803. The vertical OB region 801 and the horizontal OB region 802 are shielded from light. The opening region 803 is not shielded from light. The pixel region PA includes a row of a region Region_i where image signals Pa and Pb of a part of the photodiodes 601a and 601b are read out, and a row of a region Region_c where a composite image signal Pab of all of the photodiodes 601a and 601b is read out. Each of the vertical OB region 801, the horizontal OB region 802, and the opening region 803 includes the row of the region Region_i and the row of the region Region_c. In the region Region_c, the composite image signal Pab of the sub-pixels a and b is read out through the readout operation described below. In the region Region_i, each of the image signal Pa and the image signal Pb is read out through the readout operation described below. In other words, signals of the sub-pixels a and b are read out separately. An arrangement, a position, or a ratio of the divided readout row can be changed for each frame according to a setting of the AF frame or movement of the object.

Figure 9A:
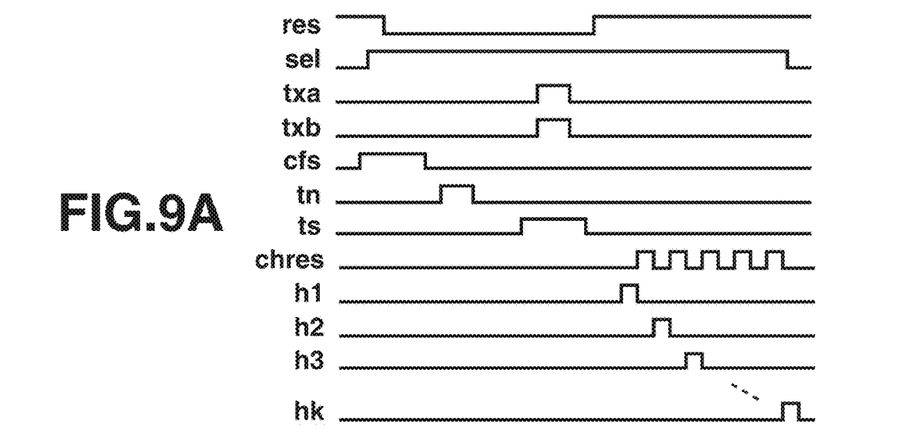
FIGS. 9A, 9B, and 9C are timing charts illustrating a readout operation of the image sensor.
Figure 9B:
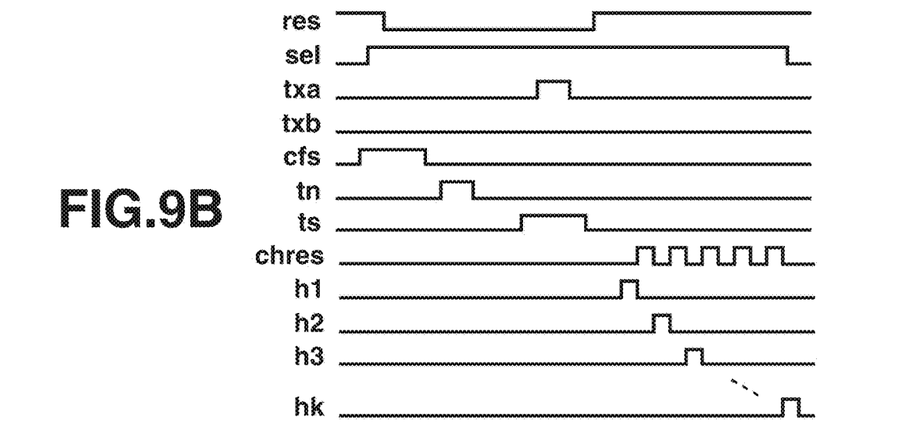
Figure 9C:
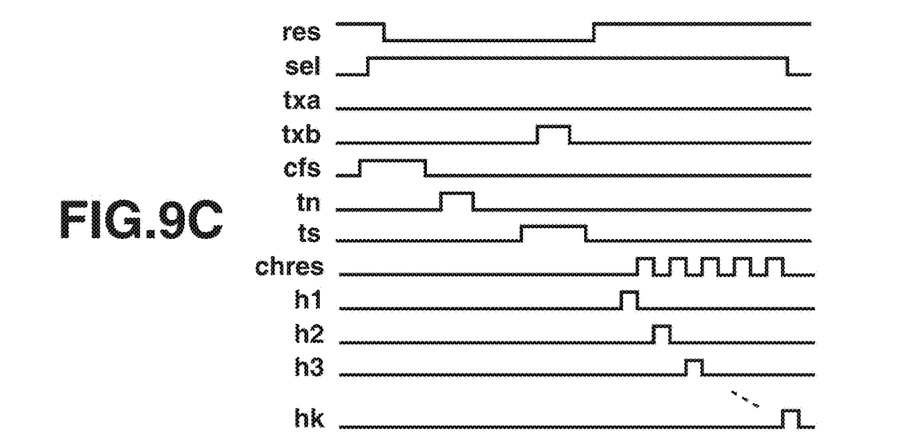

FIGS. 9A to 9C are timing charts illustrating the readout operation of the image sensor 106. FIG. 9A is a timing chart illustrating the readout operation to be executed with respect to a unit pixel 200 in the row of the region Region_c. First, the signal cfs becomes a high-level, so that the switch 704 is ON, and the operating amplifier 703 becomes a buffer state. Then, the signal sel becomes a high-level, so that the pixel selection switch 606 of the unit pixel 200 is ON. Thereafter, the signal res becomes a low-level, so that the FD reset switch 605 is OFF, and a reset state of the FD portion 603 is released. The operating amplifier 703 outputs the noise signal N based on release of a reset state of the unit pixel 200. Then, the signal cfs returns to a low-level, so that the switch 704 is OFF. After that, the signal tn becomes a high-level, so that the transfer switch 706 transfers the noise signal N output from the operating amplifier 703 to the N-signal retention capacitor 708. The N-signal retention capacitor 708 stores the noise signal N.

After the reset state is released, the photodiodes 601a and 601b store electric charges generated by the photoelectric conversion. Then, the signal tn becomes a low-level, so that the transfer switch 706 is OFF. After that, the signal ts becomes a high-level, so that the transfer switch 705 is ON. At the same time, the signals txa and txb become a high-level, so that the transfer gates 602a and 602b are ON. Through the above operation, an electric charge signal stored in the photodiode 601a of the sub-pixel a and an electric charge signal stored in the photodiode 601b of the sub-pixel b are composited at the FD portion 603. The FD amplifier 604 outputs a composite signal according to the composite electric charge signal of the FD portion 603 to the row signal line 502 via the pixel selection switch 606. The operating amplifier 503 amplifies the signal output to the row signal line 502 with a gain according to a capacity ratio between the capacitor value C1 of the clamp capacitor 701 and the capacitor value C2 of the feedback capacitor 702, and outputs the composite signal Sab to the S-signal retention capacitor 707 via the transfer switch 705. The composite signal Sab is stored in the S-signal retention capacitor 707. Then, the signals txa and txb become a low-level, so that the transfer gates 602a and 602b are OFF. Next, the signal ts becomes a low-level, so that the transfer switch 705 is OFF. Then, the signal res becomes a high-level, so that the FD reset switch 605 is ON, and the FD portion 603 is reset to the power source voltage Vdd.

Next, the output signal h1 of the horizontal scanning circuit 509 becomes a high-level, so that the horizontal transfer switches 505 and 506 of the first row are ON. Through the above operation, in the first row, the composite signal Sab stored in the S-signal retention capacitor 707 and the noise signal N stored in the N-signal retention capacitor 708 are transferred to the horizontal output lines 507 and 508. The differential amplifier 510 outputs a difference between the composite signal Sab input through the horizontal output line 507 and the noise signal N input through the horizontal output line 508 to the output terminal 511. The horizontal scanning circuit 509 sequentially brings the selection signals h1, h2, . . . , and hk of respective rows into a high-level, so that the composite signal Sab stored in the S-signal retention capacitor 707 and the noise signal N stored in the N-signal retention capacitor 708 of each row are sequentially transferred to the horizontal output lines 507 and 508. Through the above operation, the output terminal 511 outputs one-row worth of the composite image signals Pab. In addition, every time the signals of respective rows are read out by the signals h1 to hk, the signal chres becomes a high-level to cause the horizontal output line reset switches 512 and 513 to be ON, so that the horizontal output lines 507 and 508 are temporarily reset to the level of the reset voltage Vchres. The readout operation of the row of the region Region_c is described as the above. Through the above-described operation enables to read out one-row worth of the composite image signals Pab.

FIGS. 9B and 9C are timing charts illustrating the readout operation to be executed on the unit pixel 200 in the row of the region Region_i. FIG. 9B illustrates the operation of reading out the pixel signal Sa. Unlike FIG. 9A, in FIG. 9B, in order to read out only a signal of the sub-pixel a, only the signal txa becomes a high-level without making the signal txb become a high-level. With this operation, one-row worth of the image signals Pa can be read out.

After the readout operation of the image signal Pa in FIG. 9B is ended, the readout operation of the image signal Pb in FIG. 9C is started. FIG. 9C is different from FIG. 9B in that only a transfer gate 602b of the sub-pixel b becomes ON to read out only a signal of the sub-pixel. Therefore, only the signal txb becomes a high-level without making the signal txa become a high-level. With this operation, the image signals Pb for the row can be read out. In the present exemplary embodiment, after the operation in FIG. 9B is executed, the operation in FIG. 9C is consecutively executed on the same row, so that the image signals Pa and Pb of the same pixel are acquired.

Figure 10:
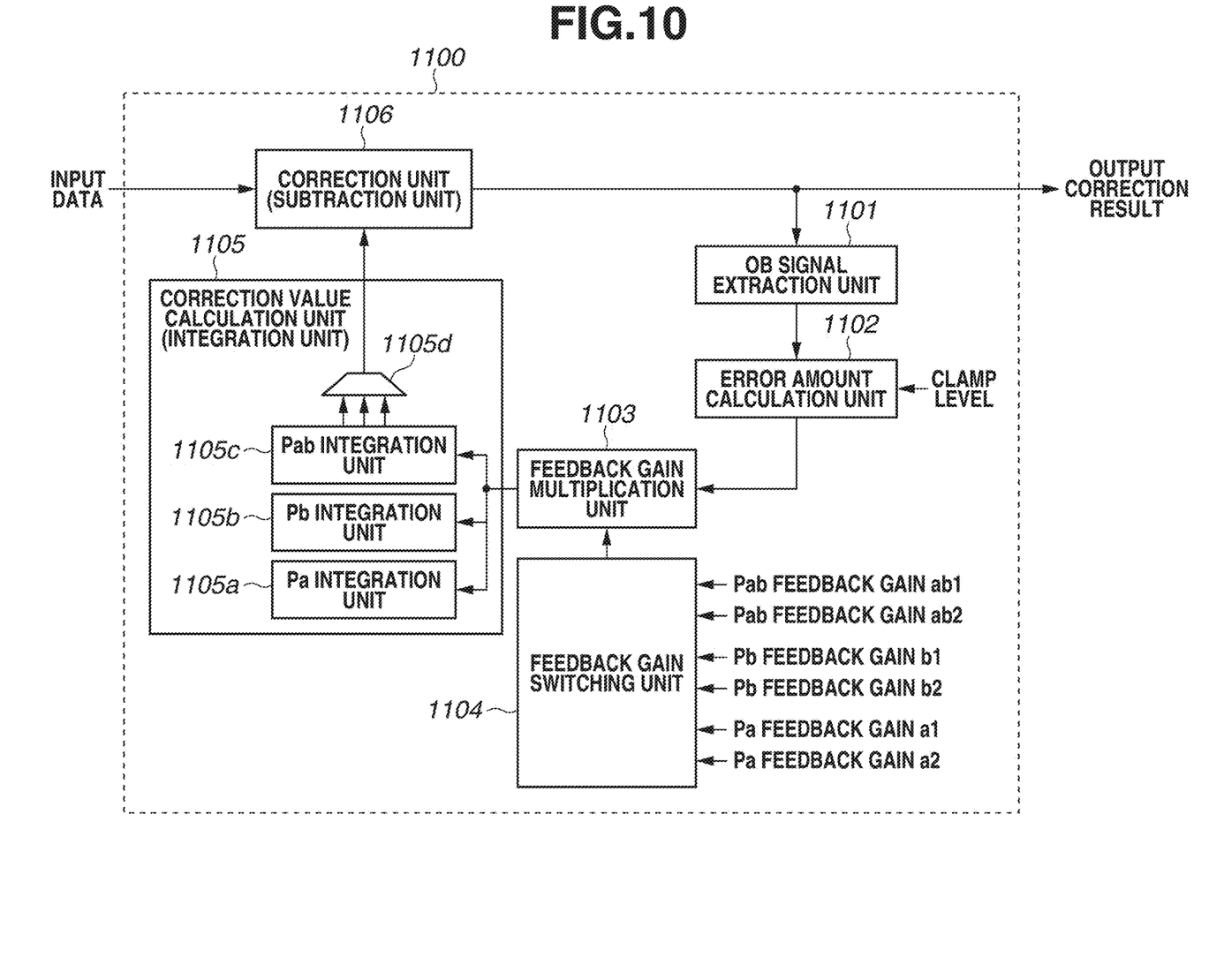
FIG. 10 is a block diagram illustrating a configuration example of an optical black (OB) clamp processor.

FIG. 10 is a block diagram illustrating a configuration example of an OB clamp processor 1100. The OB clamp processor 1100 is provided inside the AFE 107. An image signal of digital data converted by the AFE 107 through AD conversion processing is input to the OB clamp processor 1100. An OB signal extraction unit 1101 extracts a signal of a pixel (OB pixel) in the vertical OB region 801 or the horizontal OB region 802 at a timing at which data of the vertical OB region 801 or the horizontal OB region 802 is input thereto. The OB signal extraction unit 1101 outputs a signal of one OB pixel used for the OB clamp processing to an error amount calculation unit 1102 at a time. In addition, the OB signal extraction unit 1101 may acquire an average value of a plurality of OB pixels and output the average value to the error amount calculation unit 1102. The error amount calculation unit 1102 takes a difference between a preset dark level correction target value (clamp level) and a current output level of the OB pixel output from the OB signal extraction unit 1101 and calculates the error amount. A feedback gain multiplication unit 1103 multiplies the error amount calculated by the error amount calculation unit 1102 by a feedback gain received from a feedback gain switching unit 1104. The feedback gain is set to a value less than 1 in order not to make the calculation result oscillate. Further, in order to prevent the image sensor 106 from excessively reacting to noise or scratches, a gain previously adjusted as appropriate according to the sensor characteristics is set as the feedback gain. The feedback gain switching unit 1104 selects one feedback gain from among a plurality of preset feedback gains and outputs the selected feedback gain to the feedback gain multiplication unit 1103.

The feedback gain switching unit 1104 selects a Pab feedback gain ab1 or ab2 for the image signal Pab in the region Region_c. At this time, in the vertical OB region 801, the feedback gain switching unit 1104 selects the Pab feedback gain ab1 in order to quickly follow a large dark current amount. Further, in the horizontal OB region 802, the feedback switching unit 1104 selects the Pab feedback gain ab2 in order to suppress sensitivity to noise or scratches. The Pab feedback gain ab1 is greater than the Pab feedback gain ab2.

The image signals Pa and Pb are read out in the region Region_i. When the image signal Pa is read out in the region Region_i, the feedback gain switching unit 1104 selects a Pa feedback gain a1 or a2. At this time, the feedback gain switching unit 1104 selects the Pa feedback gain a1 in the vertical OB region 801 and selects the Pa feedback gain a2 in the horizontal OB region 802. The Pa feedback gain a1 is greater than the Pa feedback gain a2.

When the image signal Pb is read out in the region Region_i, the feedback gain switching unit 1104 selects a Pb feedback gain b1 or b2. At this time, the feedback gain switching unit 1104 selects the Pb feedback gain b1 in the vertical OB region 801 and selects the Pb feedback gain b2 in the horizontal OB region 802. The Pb feedback gain b1 is greater than the Pb feedback gain b2.

In one embodiment, the Pa feedback gain a2 and the Pb feedback gain b2 be greater than the Pab feedback gain ab2. As described with reference to FIGS. 9B and 9C, because both of the image signals Pa and Pb are read out in the region Region_i, the readout time is longer than the readout time in the region Region_c. Therefore, as the number of rows of the region Region_i is often reduced to suppress the entire readout time, a limited number of rows can be used for the OB clamp processing, so that followability to dark shading is lowered. In order to cover the followability, in one embodiment, the feedback gain a2 and the feedback gain b2 be set to be the greater values. Also, the Pa feedback gain a1 and the Pb feedback gain b1 be set to be the values greater than the value of the Pab feedback gain ab1 according to the number of rows of the vertical OB region 801.

A correction value calculation unit 1105 integrates the calculation result of the feedback gain multiplication unit 1103 to calculate an Ob clamp correction value. The correction value calculation unit 1105 includes a Pa integration unit 1105a, a Pb integration unit 1105b, a Pab integration unit 1105c, and a correction value switching unit 1105d. The Pa integration unit 1105a, the Pb integration unit 1105b, and the Pab integration unit 1105c separately integrate the calculation results of the image signals Pa, Pb, and Pab calculated by the feedback gain multiplication unit 1103. The correction value switching unit 1105d outputs an OB clamp correction value according to any one of the integrated values calculated by the Pa integration unit 1105a, the Pb integration unit 1105b, and the Pab integration unit 1105c to the correction unit 1106. The correction unit 1106 subtracts the OB clamp correction value output from the correction value calculation unit 1105 from the data input to the OB clamp processor 1100 to execute correction processing on the image signal, and outputs a correction result. Depending on whether a pixel as a correction target corresponds to the image signal Pa, Pb, or Pab, the correction value switching unit 1105d outputs the OB clamp correction value according to any one of integrated values calculated by the Pa integration unit 1105a, the PB integration unit 1105b and the Pab integration unit 1105c. The correction value switching unit 1105d outputs a correction value based on the integrated value calculated by the Pa integration unit 1105a with respect to the image signal Pa, outputs a correction value based on the integrated value calculated by the Pb integration unit 1105b with respect to the image signal Pb, and outputs a correction value based on the integrated value calculated by the Pab integration unit 1105c with respect to the composite image signal Pab.

The OB signal extraction unit 1101 described above extracts a signal of an OB pixel from among the signals output from the correction unit 1106. Therefore, by repeatedly executing the correction processing, an error amount between the signal level of the OB pixel and the clamp level is reduced gradually, and a correction result of the output (dark level) of the OB pixel and the clamp level eventually converge and conform to each other.

Figure 11:
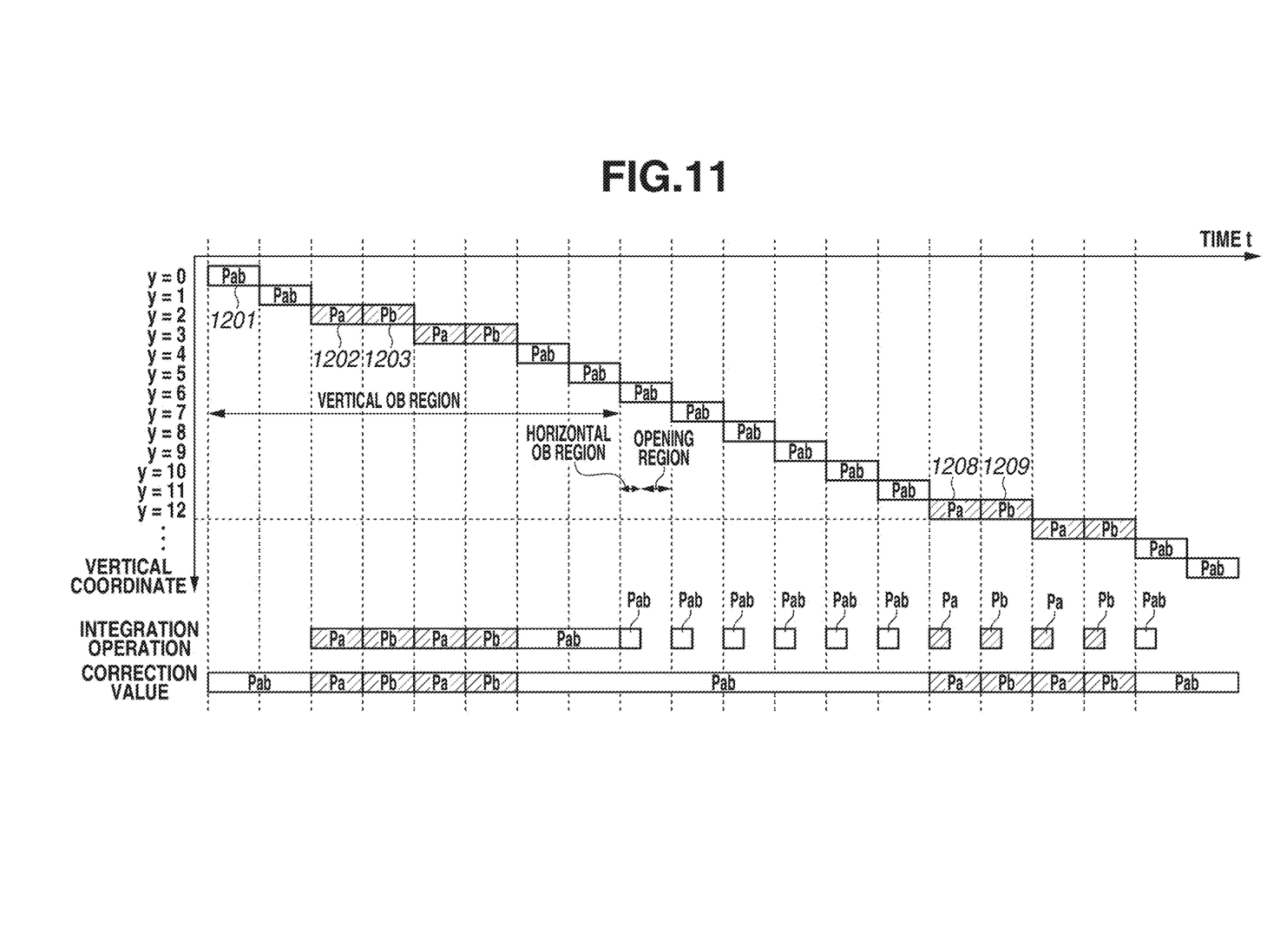
FIG. 11 is a timing chart illustrating an operation of the OB clamp processor.

FIG. 11 is a timing chart illustrating output signals of the image sensor 106 and the operation of the OB clamp processor 1100, in which the output signals of the image sensor 106 and the above-described operation of the correction value calculation unit 1105 are described in a chronological order. A vertical direction corresponds to a vertical coordinate of the image sensor 106. However, for the sake of simplicity, the number of rows is illustrated in a fairly simplified manner. Hereinafter, a control method of the imaging apparatus 100 will be described.

An image signal 1201 represents image signals Pab read out from a row of a vertical coordinate y=0 as a first readout row. As illustrated in FIG. 8, the vertical coordinate y=0 is the region Region_c, so that one-row worth of the composite image signals Pab are output from the image sensor 106. The operation similar to the above is executed with respect to a row of a vertical coordinate y=1. The correction value calculation unit 1105 outputs a correction value for the image signal Pab in response to the output signal of the image sensor 106. After that, the correction value calculation unit 1105 switches and outputs the correction value from among the correction values for the image signals Pab, Pa, and Pb according to the image signal output from the image sensor 106 in that period.

An image signal 1202 represents image signals Pa of a row of the region Region_i in the vertical OB region 801 at a vertical coordinate y=2. In the row of the vertical coordinate y=2, first, the image sensor 106 outputs one-row worth of the image signals Pa through the operation illustrated in FIG. 9B. During this period, for the purpose of clamp processing of image signals of the vertical OB region 801, the correction value calculation unit 1105 executes the integration operation through the Pa integration unit 1105a.

Next, as indicated by an image signal 1203, the image sensor 106 similarly outputs one-row worth of the image signals Pb from the same row of the vertical coordinate y=2 through the operation illustrated in FIG. 9C. During this period, the correction value calculation unit 1105 executes the integration operation through the Pb integration unit 1105b. The operation similar to the above is executed with respect to a row of a vertical coordinate y=3.

At the vertical coordinates y=4 and y=5, the vertical OB region 801 becomes the region Region_c again, so that the image sensor 106 outputs the image signal Pab. Herein, the vertical coordinates y=0 to y=5 correspond to the vertical OB region 801. The correction value calculation unit 1105 executes the integration operation through the Pab integration unit 1105c.

At the vertical coordinate y=6 and subsequent vertical coordinates, one-row worth of signals include the signals of the horizontal OB region 802 and the signals of the opening region 803. At the vertical coordinates y=6 to y=11, readout operation of the region Region_c of the horizontal OB region 802 and the opening region 803 is executed. The horizontal OB region 802 and the opening region 803 are the region Region_c, so that the image signals Pab are output. The correction value calculation unit 1105 executes the integration operation of only a data period of the horizontal OB region 802. The feedback gain switching unit 1104 changes a feedback gain to be selected. At the vertical coordinate y=6 and subsequent vertical coordinates, the feedback gain switching unit 1104 selects a smaller feedback gain with reduced sensitivity for the horizontal OB region 802 in comparison to the feedback gain used for the vertical OB region 801. The feedback gain switching unit 1104 selects a feedback gain Pab2 at the vertical coordinates y=6 to y=11.

At a vertical coordinate y=12, the horizontal OB region 802 and the opening region 803 are the region Region_i. An image signal 1208 represents the image signals Pa of the horizontal OB region 802 and the opening region 803, and the image sensor 106 outputs the image signals Pa of the horizontal OB region 802 and the opening region 803. After that, an image signal 1209 represents the image signals Pb of the horizontal OB region 802 and the opening region 803, and the image sensor 106 outputs the image signals Pb of the horizontal OB region 802 and the opening region 803. The feedback gain switching unit 1104 selects the Pa feedback gain a2 in a readout period of the image signal Pa, and selects the Pb feedback gain b2 in a readout period of the image signal Pb. The operation similar to the above is executed with respect to a row of a vertical coordinate y=13.

According to the present exemplary embodiment, the regions Region_i and Region_c are provided, and the feedback gain is selected by the feedback gain switching unit 1104. With this configuration, while suppressing an increase in readout time caused by acquisition of the image signals Pa and Pb used for focus detection, correction of the image signals Pa and Pb can be precisely executed through the OB clamp processing while following the dark shading in a vertical direction, and thus it is possible to acquire an image with favorable image quality.

Further, the row of the region Region_i can be freely arranged according to an imaging mode or an imaging condition, and a position thereof may be changed at each frame. The region Region_i does not have to be arranged at an equal interval, and may be arranged freely.

Further, in the OB clamp processing, although all of signals of OB pixels in the row of the vertical OB region 801 and all of signals of OB pixels in the row of the horizontal OB region 802 are used for calculating the correction value, the configuration is not limited thereto. A part of the signals of the OB pixels in the row may be used for calculating the correction value.

Further, although different feedback gains are used for the image signals Pab, Pa, and Pb in the vertical OB region 801 and the horizontal OB region 802, a feedback gain common to the image signals Pab, Pa, and Pb may be used for the vertical OB region 801. In other words, the feedback gains a1, b1, and ab1 may be equal to each other.

In the above-described configuration, although the image signal Pa of the sub-pixel a and the image signal Pb of the sub-pixel b are read out, the configuration is not limited thereto. For example, the image signal Pa of the sub-pixel a and the composite image signal Pab of the signals of the sub-pixels a and b may be read out. In this case, after the image signal Pa of the sub-pixel a is read out, the image signal Pab composited from the signals of the sub-pixels a and b at the FD portion 603 is read out.

Further, although a configuration in which the OB clamp processor 1100 is provided inside the AFE 107 has been described, the configuration is not limited thereto. For example, the OB clamp processor 1100 may be provided inside the image sensor 106. The image sensor 106 may be configured of a digital output type sensor including the AD conversion function.

As described above, the vertical scanning circuit 501 is a readout controller which reads out the image signal Pa or Pb of a part of the photodiodes 601a and 601b of a unit pixel 200 in the light-shielded regions 801 and 802 of the image region PA. Further, the vertical scanning circuit 501 reads out the composite image signal Pab of all of the photodiodes 601a and 601b in a different unit pixel 200 in the light-shielded regions 801 and 802. Furthermore, the vertical scanning circuit 501 reads out the image signal Pa or Pb of a part of the photodiodes 601a and 601b in a unit pixel 200 in the opening region 803 of the image region PA. Further, the vertical scanning circuit 501 reads out the composite image signal Pab of all of the photodiodes 601a and 601b in a different unit pixel 200 in the opening region 803.

The feedback gain multiplication unit 1103 multiplies an error amount between the composite image signal Pab of all of the photodiodes 601a and 601b of the unit pixel 200 in the light-shielded regions 801 and 802 and the clamp level by the first feedback gain ab1 or ab2. Then, based on an integrated value obtained by the multiplication by the first feedback gain ab1 or ab2, the correction unit 1106 corrects the composite image signal Pab of all of the photodiodes 601a and 601b of the unit pixel 200 in the opening region 803.

Further, the feedback gain multiplication unit 1103 multiplies an error amount between the image signal Pa or Pb of a part of the photodiodes 601a and 601b of the unit pixel 200 in the light-shielded region 801 and 802 and the clamp level by the second feedback gain a1, a2, b1, or b2. Then, based on an integrated value obtained by the multiplication by the second feedback gain a1, a2, b1, or b2, the correction unit 1106 corrects the image signal Pa or Pb of a part of the photodiodes 601a and 601b of the unit pixel 200 in the opening region 803.

Specifically, the vertical scanning circuit 501 separately reads out the image signal Pa of a photodiode 601a and the image signal Pb of the photodiode 601b in the unit pixel 200 of the light-shielded regions 801 and 802. Further, the vertical scanning circuit 501 reads out the composite image signal Pab of the photodiodes 601a and 601b in the different unit pixel 200 of the light-shielded regions 801 and 802. Further, the vertical scanning circuit 501 separately reads out the image signal Pa of the photodiode 601a and the image signal Pb of the photodiode 601b of the unit pixel 200 in the opening region 803. Further, the vertical scanning circuit 501 reads out the composite image signal Pab of the photodiodes 601a and 601b of the different unit pixel 200 in the opening region 803.

The feedback gain multiplication unit 1103 outputs a first multiplication result obtained by multiplying an error amount between the composite image signal Pab of the photodiodes 601a and 601b of the unit pixel 200 in the vertical OB region 801 and the clamp level by the first feedback gain ab1. The feedback gain multiplication unit 1103 outputs a fourth multiplication result obtained by multiplying an error amount of the composite image signal Pab of the photodiodes 601a and 601b of the unit pixel 200 in the horizontal OB region 802 and the clamp level by the fourth feedback gain ab2. Based on the integrated value of the first and the fourth multiplication results, the correction unit 1106 corrects the composite image signal Pab of the photodiodes 601a and 601b of the unit pixel 200 in the opening region 803.

The feedback gain multiplication unit 1103 outputs a second multiplication result obtained by multiplying an error amount between the image signal Pa of the photodiode 601a of the unit pixel 200 in the vertical OB region 801 and the clamp level by the second feedback gain a1. The feedback gain multiplication unit 1103 outputs a fifth multiplication result obtained by multiplying an error amount between the image signal Pa of the photodiode 601a of the unit pixel 200 in the horizontal OB region 802 and the clamp level by the fifth feedback gain a2. Based on the integrated value of the second and the fifth multiplication results, the correction unit 1106 corrects the image signal Pa of the photodiode 601a of the unit pixel 200 in the opening region 803.

The feedback gain multiplication unit 1103 outputs a third multiplication result obtained by multiplying an error amount between the image signal Pb of the photodiode 601b of the unit pixel 200 in the vertical OB region 801 and the clamp level by the third feedback gain b1. The feedback gain multiplication unit 1103 outputs a sixth multiplication result obtained by multiplying an error amount between the image signal Pb of the photodiode 601b of the unit pixel 200 in the horizontal OB region 802 and the clamp level by the sixth feedback gain b2. Based on the integrated value of the third and the sixth multiplication results, the correction unit 1106 corrects the image signal Pb of the photodiode 601b of the unit pixel 200 in the opening region 803.

The above-described exemplary embodiments are merely the examples embodying the disclosure, and shall not be construed as limiting the technical range of the disclosure. In other words, the disclosure can be realized in diverse ways without departing from the technical spirit or main features of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-145554, filed Jul. 25, 2016, which is hereby incorporated by reference herein in its entirety.

What is claimed is:
1. An imaging apparatus comprising:
a pixel region in which a plurality of unit pixels each having a macro lens, a first photoelectric conversion portion and a second photoelectric conversion portion is arranged in a matrix form, wherein the pixel region includes an opening pixel region and a light-shielded pixel region;
a driver that drives the pixel region so that a signal of at least one of the first photoelectric conversion portion and the second photoelectric conversion portion of each unit pixel is read out independently in a first pixel row of the pixel region, and a signal of at least one of the first photoelectric conversion portion and the second photoelectric conversion portion of each unit pixel is not read out independently in a second pixel row of the pixel region different from the first pixel row;

a clamp processor that clamps signals of the opening pixel region of the pixel region to a reference level based on signal of the light-shield pixel region of the pixel region; and a controller that controls the clamp processor to clamp output signals of the second pixel row in the opening pixel region based on a result of multiplication in which a difference between the output signal of the second row in the light-shielded region and the reference level is multiplied by a first feedback gain, and to clamp output signals of the first pixel row in the opening pixel region based on a result of multiplication in which a difference between the output signal of the first pixel row in the light-shielded region and the reference level is multiplied by a second feedback gain, wherein the second feedback gain is greater than the first feedback gain.

2. A control method of an imaging apparatus including a pixel region in which a plurality of unit pixels each having a micro lens, a first photoelectric conversion portion and a second photoelectric conversion portion is arranged in a matrix form, wherein the pixel region includes an opening pixel region and a light-shielded pixel region, the control method comprising:

driving the pixel region by a driver so that a signal of at least one of the first photoelectric conversion portion and the second photoelectric conversion portion of each unit pixel is read out independently in a first pixel row of the pixel region, and a signal of at least one of the first photoelectric conversion portion and the second photoelectric conversion portion of each unit pixel is not read out independently in a second pixel row of the pixel region different from the first pixel row;

clamping signals of the opening pixel region of the pixel region to a reference level based on signals of the light-shield pixel region of the pixel region by a clamp processor; and controlling, by a controller, the clamp processor to clamp output signals of the second pixel row in the opening pixel region based on a result of multiplication in which a difference between the output signal of the second row in the light-shielded region and the reference level is multiplied by a first feedback gain, and to clamp output signals of the first pixel row in the opening pixel region based on a result of multiplication in which a difference between the output signal of the first pixel row in the light-shielded region and the reference level is multiplied by a second feedback gain, wherein the second feedback gain is greater than the first feedback gain.

3. The imaging apparatus according to claim 1, wherein the driver drives the pixel region so that a composite signal of the first photoelectric conversion portion and a second photoelectric conversion portion of each unit pixel is read out in the second pixel row of the pixel region, and a signal of the first photoelectric conversion portion and a signal of the second photoelectric conversion portion of each unit pixel are separately read out in the first pixel row of the pixel region.

4. The imaging apparatus according to claim 3, wherein the controller controls the clamp processor to clamp the composite signal of the first photoelectric conversion portion and the second photoelectric conversion portion of the second pixel row to the reference level with the first feedback gain, and to clamp the signal of the first photoelectric conversion portion of the first pixel row to the reference level with the second feedback gain, and to clamp the signal of the second photoelectric conversion portion of the first pixel row to the reference level with a third feedback gain.

5. The imaging apparatus according to claim 4, wherein the third feedback gain is greater than the first feedback gain.

6. The imaging apparatus according to claim 1, wherein the controller controls a convergence time for the clamp processor to clamp output signals of the second pixel row to the reference level and a convergence time for the clamp processor to clamp output signals of the first pixel row to the reference level to be different from each other.

* * * * *